Nov. 9, 1971  W. C. MATTHEWS  3,618,511
CONVEYOR COMPRESSION CAGE
Filed Aug. 25, 1970  4 Sheets-Sheet 2

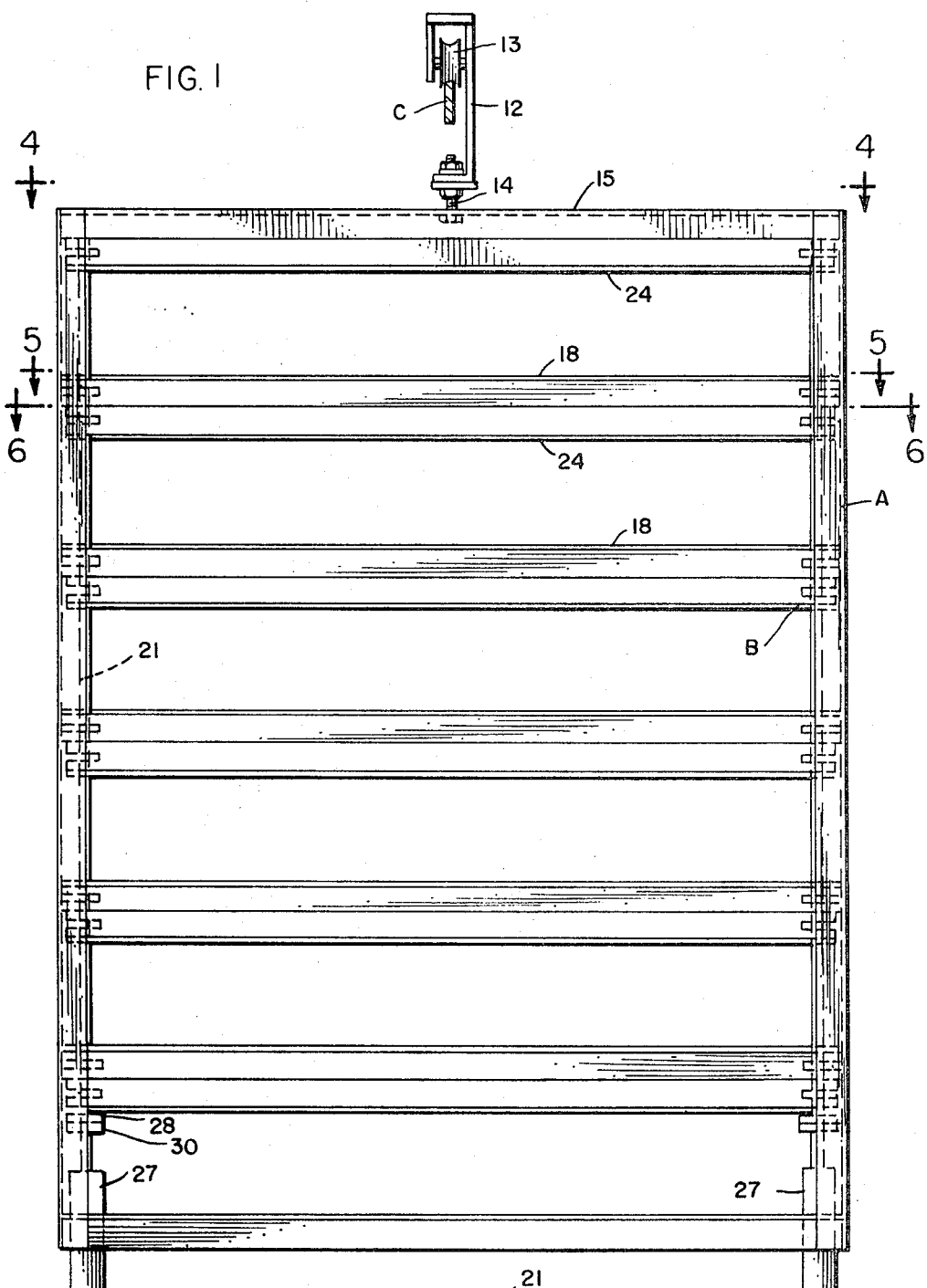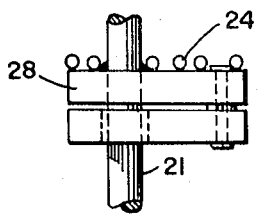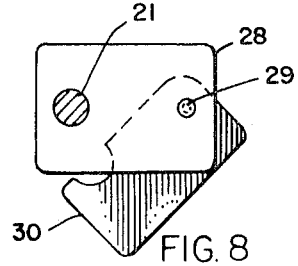

INVENTOR:
WILL C. MATTHEWS
BY
Carl C. Batz
ATT'Y

Nov. 9, 1971  W. C. MATTHEWS  3,618,511
CONVEYOR COMPRESSION CAGE
Filed Aug. 25, 1970  4 Sheets-Sheet 3

INVENTOR:
WILL C. MATTHEWS
BY
Carl C. Balz
ATT'Y

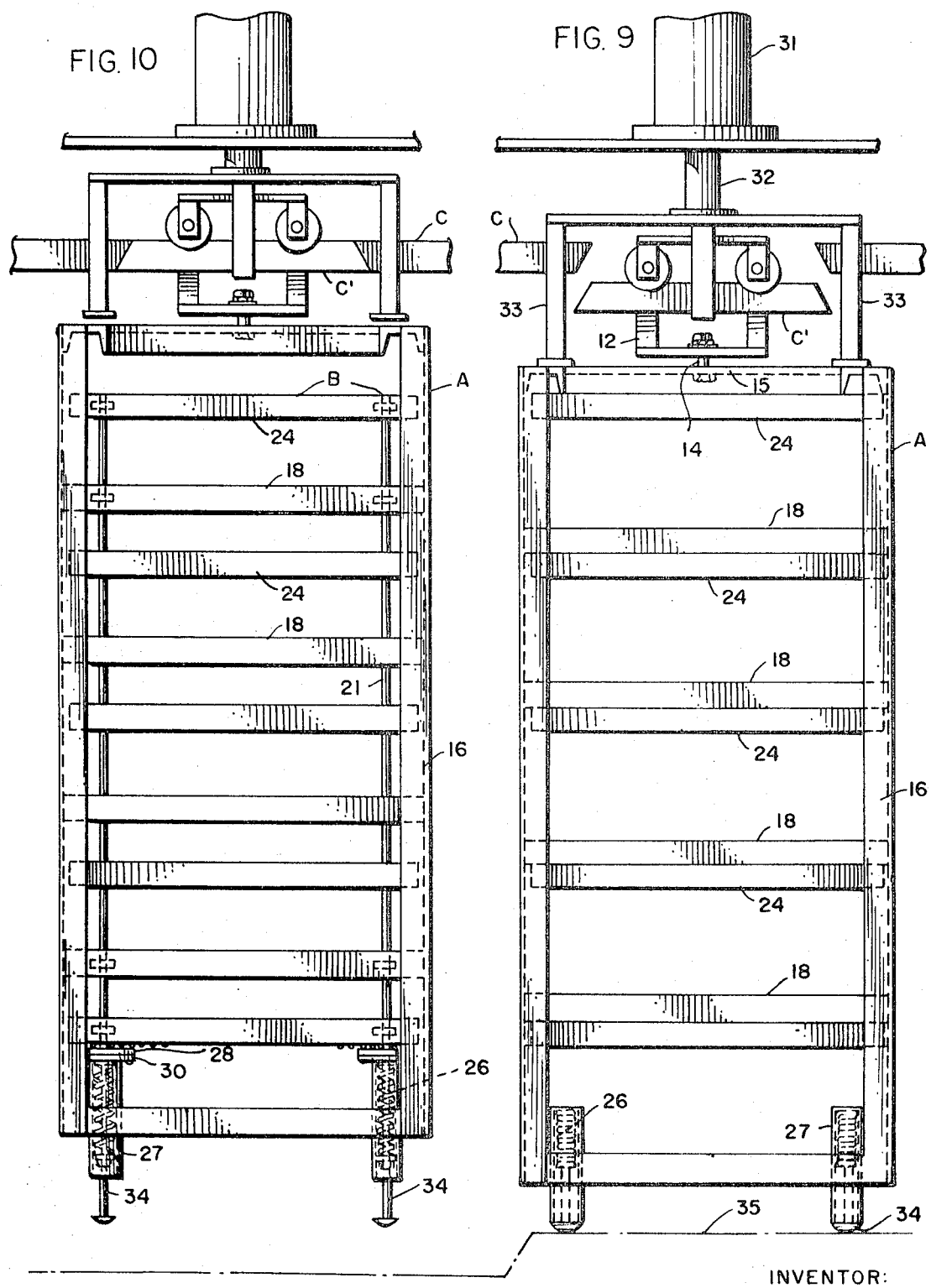

United States Patent Office 3,618,511
Patented Nov. 9, 1971

3,618,511
CONVEYOR COMPRESSION CAGE
Will C. Matthews, Park Forest, Ill., assignor to
Armour and Company, Chicago, Ill.
Filed Aug. 25, 1970, Ser. No. 66,847
Int. Cl. B30b 7/02
U.S. Cl. 100—194                        9 Claims

ABSTRACT OF THE DISCLOSURE

An outer cage frame mounted for travel on a conveyor rail or provided with wheels for conveying on floors is provided with spaced screen shelves and encloses an inner slidably-related frame having spaced presser screens, with spring means urging the presser screens toward the shelves, power means being provided to open spaces between the presser screens and shelves for loading and unloading the shelves while energizing the springs, and also effective for releasing the spring energy for moving the inner frame to compress objects loaded onto the screen shelves.

BACKGROUND AND SUMMARY

Products such as hams and sausage bodies are pressed between screens for processing, as by heating, smoking, chilling, etc. The present method is to place the hams, etc. between two screens and then attach a series of individual coil springs about the periphery of the screens in order to press them together. This method requires an unacceptable amount of manual labor in the attaching and detaching of springs and handling loose screens while also requiring a high cleaning cost of loose springs and screens, and the process further results in a product of non-uniform height.

I have discovered that a conveyor compression cage can be provided for controlling the finished height of the product while at the same time permitting ready loading and unloading and providing an equalized pressure on the product during processing. Several tiers of screens are mounted within a metal frame in which rods are slidably mounted and carry movable presser screens equipped with spring means for urging the presser screens against the hams or other bodies located on the shelves. At the point of loading, an air cylinder or other power means is provided for compressing the springs and opening the area between the shelves and presser screens, the spring exerting on each individual ham an equal pressure. On unloading, the energized springs are freed to move the presser screens against the hams, etc. on the shelves. Thus, a single set of springs is employed to generate the compressive force for the entire set of shelves, while at the same time a single power cylinder is provided for opening and closing the loading area.

DRAWINGS

Figure 2:
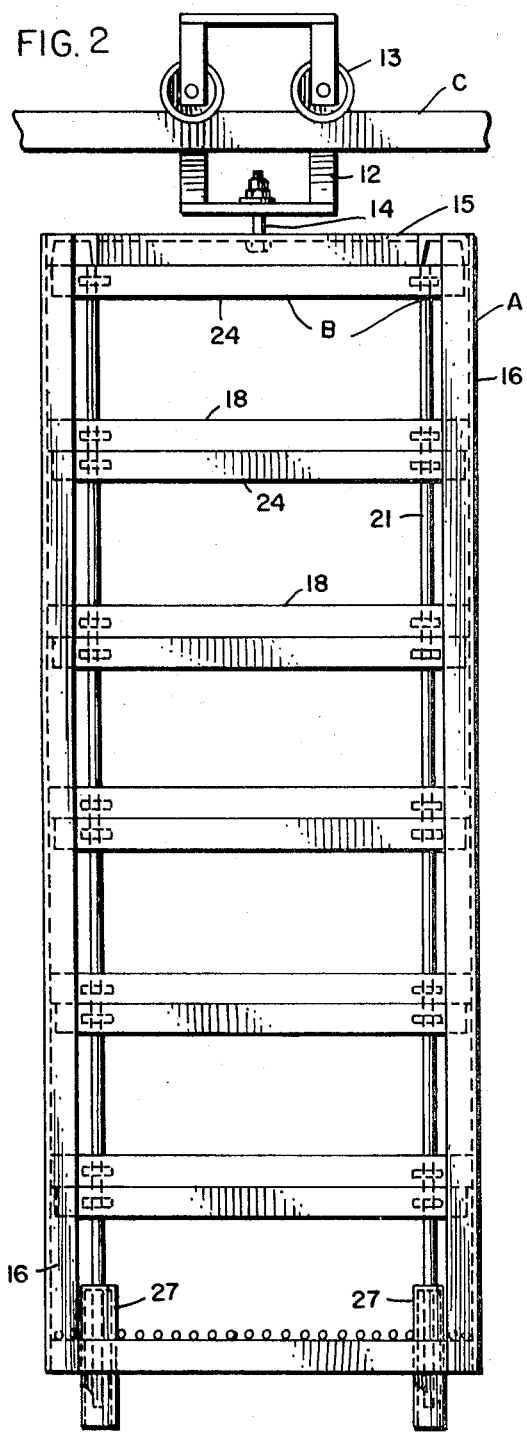
Figure 3:
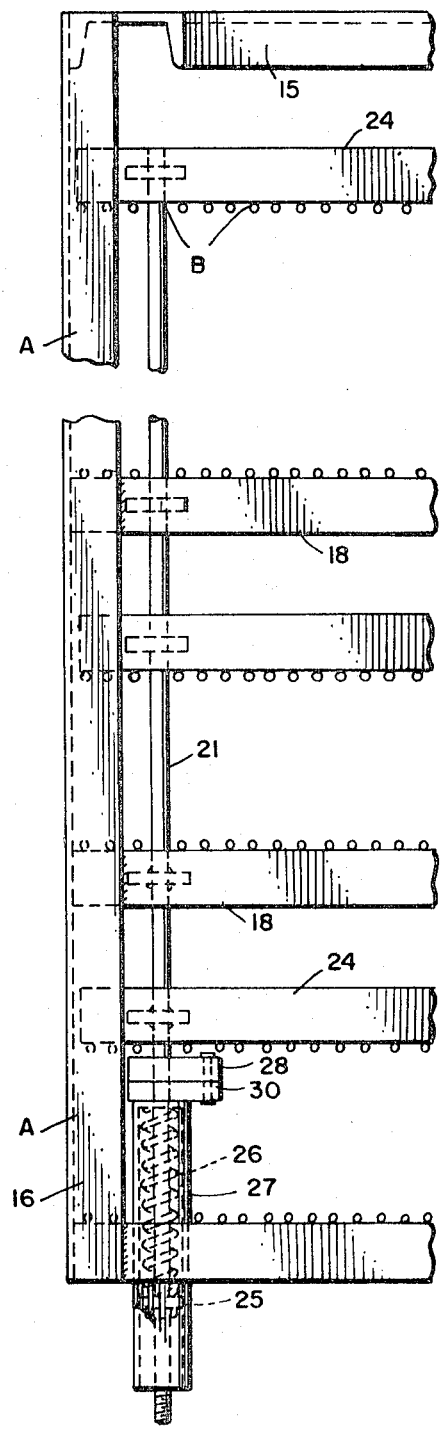
Figure 4:
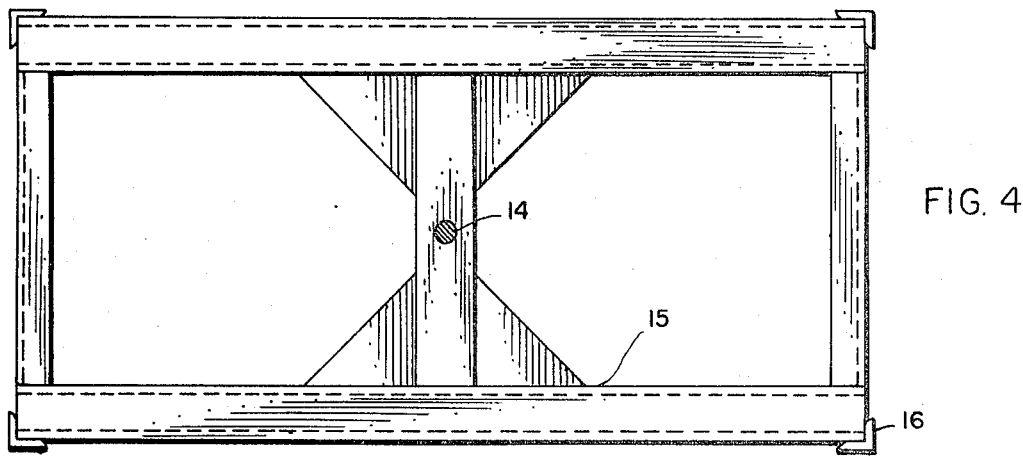
Figure 5:
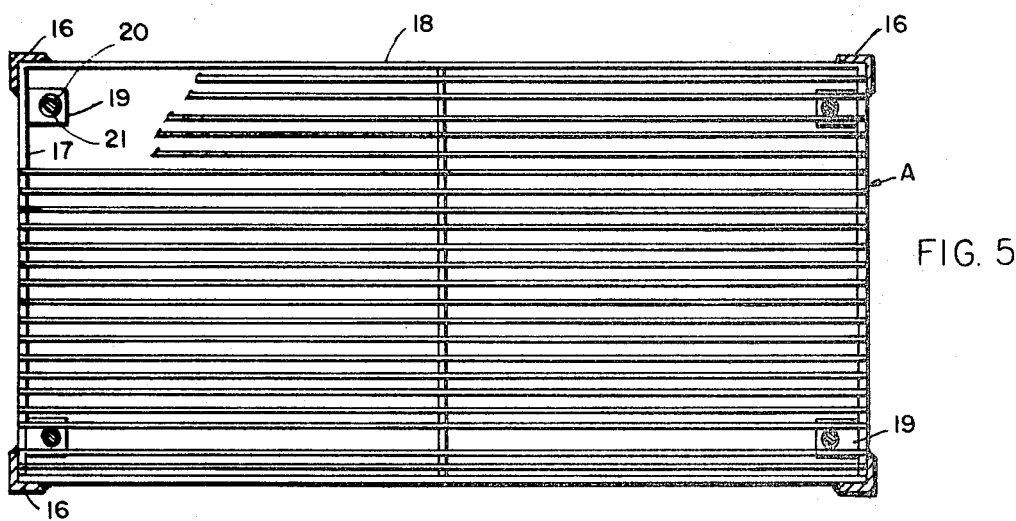
Figure 6:
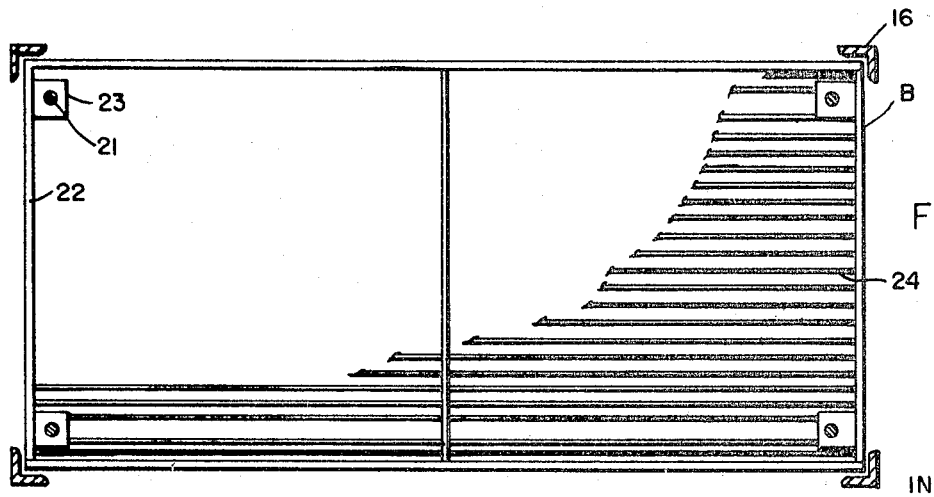

In the accompanying drawings, FIG. 1 is a front view in elevation of apparatus embodying my invention; FIG. 2, a side view in elevation showing the structure open for loading; FIG. 3, an enlarged broken side view in elevation showing the shelves and presser screens in closed position; FIG. 4, a top plan view, the view being taken as indicated at line 4—4 of FIG. 1; FIG. 5, a plan sectional view, the section being taken as indicated at line 5—5 of FIG. 1; FIG. 6, a plan sectional view, the section being taken as indicated at line 6—6 of FIG. 1; FIG. 7, a broken front view in elevation of the spacer structure employed; FIG. 8, a top plan view of the spacer structure shown in FIG. 7; FIG. 9, a side view in elevation of the structure shown in open position for loading and the power mechanism employed; and FIG. 10, a view similar to FIG. 9 but showing the cage in raised position and the compressed springs released for drawing the presser screens toward the shelves.

DETAILED DESCRIPTION

In the illustration given, A designates an outer frame equipped with shelves and enclosing an inner slidably-mounted frame B equipped with presser screens, the structure A being suspended for travel upon a rail C. The cage A is suspended by the bracket member 12 equipped with a roller 13 resting on the rail C, the bracket being connected by bolt means 14 to the top plate 15 of frame A.

The frame A is provided at its corners with angle bars 16 in which is mounted a frame member 17 provided with transverse bars forming a screen shelf 18 on which the hams, etc. may rest. Adjacent the corner angle bars 16 are guide plates 19 apertured at 20 to receive slidable rods 21.

Frame B, as shown best in FIG. 6, comprises a perimetric frame 22 provided at its corners with plates 23 through which the rods 21 extend and are fixed to the plates 23. Thus, the frame 22 moves with the rods 21 which are slidably mounted in frame A. The frame 22 is also provided with spaced bars forming a presser screen 24 engaging the hams or other objects to be compressed.

As shown best in FIG. 3, the rods 21 extend below the frame A and are provided at their bottom with a head 25. A coil spring 26 extends between the head 25 and the lower portion of presser screen B so as to normally draw the rod 21 downwardly and with the rod 21 the presser screens B. The spring 26 may be enclosed within sleeve 27.

I prefer to employ spacer means for limiting the movement of the presser screens 24 relative to the shelves 18. As shown best in FIGS. 7 and 8, a plate member 28 is welded to the screen 24 and is provided on one side with a pivot pin 29 on which a spacer lug 30 is mounted. By utilizing one or two of the members 28 or 30, the positioning of the presser screen 24 can be controlled so as to control the height of the finished product.

In the operation of the structure shown in FIGS. 1 to 8 inclusive, any suitable means may be provided for moving the frame members A and B apart so as to provide a loading area. This can be accomplished manually or by power means as desired. I prefer to employ a structure as shown best in FIGS. 9 and 10.

In the structure shown in FIGS. 9 and 10, a compressed air cylinder 31 is mounted at a depot in which the cage is to be loaded, and the air cylinder operates a piston 32 povided with downwardly-extending arms 33 adapted to engage the top plate 15 of cage frame A. The cylinder piston 32 also presses downwardly a segment C' of the track on which the bracket 12 rests and which is provided with a bolt 14 engaging the plate 15 of frame A. In this operation, the frame A is pressed downwardly to open the space between the presser screens 24 and the frame A shelves 18 so that the cage can be loaded with hams or other objects. At the same time, the downward movement of frame A causes the depending pins 34 to engage a fixed base or stop 35 which causes the springs 26 to be compressed (energized). When the power cylinder raises the support structure to the position shown in FIG. 10 and brings the segment C' into alignment with the rail C, the springs 26 are released and the stored energy in the springs draws the presser screens 24 downwardly into engagement with the hams or other objects on the shelves 18, as shown best in FIG. 10. As heretofore stated, the final process spacing between shelves 24 and 18 can be controlled by operating the spacer members 28 and 30.

In the foregoing operation, the downward movement of the cylinder piston opens the cage areas for loading with the shelves 18 spaced well apart from the presser screens 24 and in this same operation compresses the springs 26, as shown best in FIG. 9, while in the raising operation restoring the rail segment to its initial position as shown in FIG. 10, the energy of the compressed spring is utilized for drawing the presser screens 24 downwardly toward the shelves and thus exerting upon each ham or object within the entire cage an equal pressure, with the result that the ham product produced after the processing operation is of uniform height. The cage loaded with hams or other objects under compression may then be moved along the conveyor system to the smoking, heating, chilling or other desired processing chambers and an empty cage can be moved into the load position, as shown best in FIG. 9.

While I have shown the compression cage mounted on a conveyor rail, it will be understood that the cage structure may be provided with wheels for movement as a portable system on floors.

While in the foregoing specification I have set out a specific structure in considerable detail for the purpose of illustrating embodiments of the invention, it will be understood that such details may be varied widely by those skilled in the art without departing from the spirit of my invention.

What is claimed is:

1. A conveyor compression cage comprising an outer cage frame provided with spaced shelves adapted to receive objects thereon, an inner frame slidably mounted in said outer frame and provided with presser screens, spring means for urging said presser screens toward said shelves, and means for moving one of said frames to space said shelves and presser screens for the loading of said shelves while energizing said springs and for releasing the energized springs so as to move said presser screens toward said shelves.

2. The apparatus of claim 1 in which said outer cage frame is suspended from a conveyor rail.

3. The apparatus of claim 1 in which said inner frame includes rods slidably mounted in said outer frame and to which said presser screens are fixed.

4. The structure of claim 3 in which the rods have heads at one end and said spring means are coil springs which extend between said heads and said outer frame.

5. The structure of claim 4 in which said heads supporting said screens are at the bottom of said rods.

6. The structure of claim 1 in which adjustable spacer means are provided for varying the final process spacing between said presser screens and shelves.

7. In combination with a conveyor rail having a movable segment, a cage frame resting on said segment and mounted for travel on said rail and having spaced shelves, rods slidably mounted in said frame, presser screens fixed to said rods and normally lying above said shelves, heads fixed to the lower ends of said rods, springs between said heads and said frame normally urging said presser screens toward said shelves, a stop member below said heads, and means for depressing said rail segment and said cage frame to move said rods against said stop member to compress said springs and open said shelves and also for raising said segment and cage to enable said compressed springs to press said presser screens toward said shelves.

8. The structure of claim 7 in which said means consists of a power cylinder mounted above said conveyor rail and having depending arms for engaging said cage frame.

9. The structure of claim 7 in which spacer means is provided for varying the spacing between the shelves and said presser screens for controlling the height of the finished compressed product.

References Cited

UNITED STATES PATENTS

| | | | |
|---|---|---|---|
| 1,360,871 | 11/1920 | Benn | 100—265 X |
| 1,986,115 | 1/1935 | Offenhauser | 99—349 |
| 2,310,956 | 2/1943 | Hoy | 99—351 |
| 3,155,030 | 11/1964 | Curtis | 99—351 X |
| 3,393,809 | 7/1968 | Brown et al. | 211—113 |
| 3,473,465 | 10/1969 | Tonjum | 99—349 X |
| 2,310,957 | 2/1943 | Hoy | 99—351 |
| 2,059,938 | 11/1936 | Farber | 100—265 |
| 2,056,331 | 10/1936 | Shutt | 100—195 |
| 2,051,360 | 8/1936 | Adelmann | 99—351 |
| 1,856,564 | 5/1932 | Kipper | 99—351 |

BILLY J. WILHITE, Primary Examiner

U.S. Cl. X.R.

17—44.2; 99—261, 351, 443; 100—265, DIG. 10